United States Patent Office 3,282,901
Patented Nov. 1, 1966

3,282,901
PROCESS FOR THE PRODUCTION OF POLYMERIC MERCAPTANS
Paul F. Warner and Richard D. Franz, both of Phillips, Tex., assignors to Phillips Petroleum Company, a corporation of Delaware
No Drawing. Filed Nov. 6, 1961, Ser. No. 150,122
4 Claims. (Cl. 260—79)

This invention relates to high molecular weight polymeric mercaptans. In accordance with one aspect, this invention relates to an improved process for the preparation of relatively high molecular weight mercaptan derivatives of diene polymers.

Heretofore it has been proposed to prepare polymeric mercaptans from liquid polymers of conjugated dienes and hydrogen sulfide by reacting the same in the presence of a catalyst such as cobalt molybdate. Although this process has been successful it has been accompanied by the problem of insoluble polymer deposition in the reaction zone thereby decreasing catalyst life. When a fixed bed of catalyst is employed the deposition of insoluble polymers within the reactor soon plugs the catalyst bed, thereby rendering the process inoperable.

The present invention relates to an improved process for the production of high molecular weight polymeric mercaptans wherein liquid polymers of conjugated dienes are reacted with $H_2S$ in the presence of a solid catalyst under conditions such that catalyst life is substantially increased and, in fixed catalyst bed operations, reactor plugging is minimized.

Accordingly an object of this invention is to provide an improved process for the preparation of high molecular weight polymeric mercaptans.

Another object of this invention is to provide an efficient and more effective catalytic process for the preparation of mercaptan derivatives of polybutadiene.

Other aspects, objects, as well as the several advantages of this invention will be apparent from a study of the disclosure and the appended claims.

According to the invention, in a process for the production of relatively high molecular weight polymeric mercaptans comprising contacting an unsaturated polymer, such as a liquid polymer of a conjugated diene, with $H_2S$ in an inert liquid reaction medium at an elevated temperature and pressure in the presence of a solid contact catalyst active for promoting the reaction of said polymer with $H_2S$ to form said polymeric mercaptan, and recovering said mercaptan product thus produced, the present invention resides in the improvement which comprises carrying out said contacting in the presence of hydrogen in amounts up to about 5 moles of hydrogen per monomer unit in said polymer sufficient to extend the life of said catalyst.

We have found that the addition of a small amount of hydrogen gas to the reaction zone of the above-described process substantially reduces the formation and deposition of insoluble or resinous materials on the contact catalyst and reactor surfaces. We have further found that the life of such a catalyst is extended at least five times that of a catalyst wherein the reaction is carried out in the absence of added hydrogen. When fixed catalyst bed operations are employed we have found that the addition of hydrogen substantially lengthens the process cycle since reactor plugging is minimized.

The amount of hydrogen employed in the above-described process will vary appreciably and will ordinarily be expressed as the moles of hydrogen per monomer unit in the polymer being reacted with $H_2S$. The amount of hydrogen present during contacting of the polymer with the $H_2S$ will range from 0.1 to about 5 moles of hydrogen per monomer unit (or diene unit for diene polymers) in said polymer, preferably 0.2 to 3, more preferably 0.3 to 1 mole of hydrogen per monomer unit in the polymer. The hydrogen can be added to the reaction zone along with one or more of the feed streams or it can be separately introduced into the reaction or contact zone.

As indicated above, it has now been found that the diene polymer-hydrogen sulfide reaction as applied to the liquid polymers of conjugated dienes, especially liquid polybutadiene, to produce high-boiling relatively high molecular weight polymeric mercaptans, is smoothly effected in the presence of hydrogen and a solid contact catalyst preferably comprising cobalt molybdate at elevated temperature and pressure. However, molybdenum sulfide, vanadium sulfide, or other sulfur resistant metal catalysts can be used. The catalyst is preferably employed in the form of synthetic precipitated alumina gel promoted with cobalt molybdate. Such catalysts have heretofore been used to promote desulfurization reaction of hydrocarbon fractions, such as petroleum gases, vapors and liquids, but the process of the present invention involves a novel adaptation in the field of polymeric mercaptan synthesis. The amount of cobalt molybdate in the catalyst can vary appreciably but, in general, the amount of cobalt molybdate employed ranges from about 5 to about 50 weight percent, the balance being a carrier, preferably alumina. However, amounts of cobalt molybdate outside the above range can be utilized if desired. The catalyst can be prepared by any method known in the art. One particularly suitable method commonly employed is to precipitate the cobalt molybdate in the presence of an alumina gel and then activate the catalyst by heating.

The highly unsaturated polymers which can be utilized in accordance with the present invention are preferably the liquid homopolymers and copolymers of conjugated dienes. The preferred monomers employed for preparing these polymers are the conjugated dienes containing from 4 to 10, inclusive, carbon atoms per molecule such as 1,3-butadiene, isoprene, 2,3-dimethyl-1,3-butadiene, 1,3-pentadiene, 2-phenyl-1,3-butadiene, and the like. This invention is applicable to the reaction of polymers of the above defined conjugated dienes either alone or in admixture with each other and/or with one or more other compounds containing an active $CH_2=C<$ which are copolymerizable therewith. Included among these latter compounds are styrene, various alkyl-substituted styrenes, vinylnaphthalene, 4-vinyltoluene, methylacrylonitrile, methyl acrylate, vinyl chloride, 2-vinylpyridine, 3-vinylpyridine, and the like. The preferred polymer employed in the present invention is liquid polybutadiene. However, the invention is also applicable to other polymers in which 1,3-butadiene is the essential ingredient and is present in an amount which exceeds about 50 weight percent of the monomeric material.

The above-described polymers that can be reacted with $H_2S$ according to the invention can be formed by contacting one or more of the above monomers with any polymerization catalyst active for polymerization well known in the art. For example, 1,3-butadiene can be polymerized to a liquid diene polymer in the presence of an alkali metal catalyst and a suitable diluent at controlled conditions of temperature and pressure as shown in U.S. Patent 2,631,175, Willie W. Crouch, patented March 10, 1953. However, when desired, organometal initiator or catalyst systems or other known initiators which are active for the formation of liquid diene polymers can also be used.

Liquid polymers of conjugated dienes suitable as starting materials for reaction with $H_2S$ in accordance with the invention are relatively high molecular weight polymers having average molecular weights generally ranging from about 1,000 to about 3,000. These polymers are highly unsaturated and the unsaturation has been found to be in the neighborhood of about 30 double bonds per molecule, if a molecular weight of 2,000 is assumed. The sulfurized polymers obtained according to the invention can have average molecular weights as high as 20,000, or more, depending upon the polymer being sulfurized. The average molecular weights of the polymers are determined by the freezing point method employing benzene as a solvent. The freezing point method is described in "Phase Relations of Gas-Condensate Fluids," volume II, by C. Kenneth Eilerts, Monograph 10, Bureau of Mines, 1959.

The process of the present invention comprises contacting controlled proportions of a diene polymer, as described above, preferably dissolved in an inert diluent, with hydrogen sulfide in the presence of hydrogen and a cobalt molybdate catalyst under conditions selected to produce a substantial conversion of the polymer to the corresponding mercaptan. The feed or reaction mixture can be passed continuously through a stationary bed of catalyst, or otherwise contacted with a solid catalyst, and the reaction zone effluent can be either continuously or intermittently fractionated to separate reaction diluent, hydrogen sulfide and hydrogen from the product. Ordinarily, an excess of hydrogen sulfide is present in the feed and reaction zone which excess can be recovered from the reaction effluent and returned to the reaction zone along with fresh polymer and hydrogen.

The temperature employed during the above contacting will vary appreciably and will generally range from about 450° to about 650° F., preferably from 500° to 550° F. The pressure employed during said contacting is ordinarily sufficient to maintain liquid phase conditions in the reaction zone and can range as high as about 1,000 p.s.i.g. The flow rate of feed through a fixed bed of catalyst will ordinarily range from 1 to 10 liquid volumes of feed per volume of catalyst. The amount of $H_2S$ employed during said contacting will ordinarily range from about 1.5 to about 3.0 moles of $H_2S$ per monomer unit in the polymer.

Under the aforesaid conditions, the principal reaction occurring is addition of $H_2S$ to the olefinic linkages of the polymer so that at least it is theoretically possible to add one mole of $H_2S$ per diene unit in the polymer chain. The average molecular weight of a butadiene polymer is about 1500 or, in other words, 28 moles of butadiene reacted to make one mole of butadiene polymer. Theoretically 28 moles of $H_2S$ are capable of reacting with each mole of polymer.

Liquid polymers of conjugated dienes having up to about 30 weight percent combined sulfur can be prepared according to the invention. Liquid polymers having sulfur contents of 3.15 and 9.18 weight percent have been prepared by adding hydrogen sulfide to liquid polybutadiene using a cobalt molybdate-type catalyst in the presence of hydrogen. A sulfur content of about 9 weight percent indicates that from about 25 to 30 percent of the double bonds in the polymer have been reacted with sulfur. However, it is not known whether the sulfur is affixed in the form of sulfides or sulfhydryl groups; presumably both are present. However, we do not wish to be limited to any particular theory of reaction.

The total reaction effluent from the contacting zone can be treated by conventional means for recovery of unreacted hydrogen sulfide and hydrogen. Operation according to the invention can be either batchwise or continuous, with the latter usually preferred. When a fixed bed of catalyst is employed a plurality of catalyst cases can be provided in order to maintain uninterrupted operation during catalyst replacement or regeneration procedure. The hydrogen sulfide and/or hydrogen can be predissolved in the polymer charge or other means of introduction to the reaction zone can be employed.

The reaction of the diene polymer and hydrogen sulfide is preferably carried out in the presence of an inert hydrocarbon diluent, which can be the same diluent as employed for polymerization. Examples of suitable diluents include aromatic, paraffinic and cycloparaffinic hydrocarbons, it being understood that mixtures of these materials can also be used. Specific examples of suitable hydrocarbon diluents include benzene, toluene, xylene, n-butane, isobutane, n-pentane, isooctane, n-dodecane, cyclopentane, cyclohexane, methylcyclohexane and the like. A reaction diluent most often employed comprises an isoparaffinic hydrocarbon fraction boiling in the range 250 to 800° F., preferably from 250 to 350° F.

As indicated above the reaction effluent can be treated by any appropriate process for the recovery of the polymeric mercaptan and excess hydrogen and $H_2S$. The excess hydrogen sulfide can be removed or converted to an inactive material which does not produce a deleterious effect on the polymeric product. One method by which recovery of the polymeric mercaptan can be effected comprises treatment of the reaction product by purging with air at reduced pressure to strip-out unreacted $H_2S$. Other known separations or treatments can be employed for the recovery of the product depending upon the ultimate use of the material and the degree of refinement required or desired.

The polymeric mercaptans obtained in the process of the invention are useful for a wide variety of applications. For example, as set forth in copending application Serial Number 845,602, filed October 12, 1959, now U.S. Patent 3,051,695 the polymeric mercaptans produced according to the invention exhibit insecticidal activity. When desired the polymeric mercaptans of the invention can be cured to form rubbery products utilizable as caulking compounds, tank sealing compounds, rocket fuel binders and the like. The cured polymeric mercaptans and methods for curing same are set forth in copending application having Serial Number 105,884, filed April 27, 1961, now U.S. Patent 3,234,188.

A better understanding of the invention can be obtained by referring to the following illustrative examples which are not intended, however, to be unduly limitative of the invention.

*Specific examples*

A liquid polymer of butadiene and 2-methyl-5-vinylpyridine was prepared by reacting butadiene and 2-methyl-5-vinylpyridine at a temperature ranging from 190° F. to 200° F. using dispersed sodium as the catalyst and an isoparaffinic hydrocarbon fraction (Soltrol 130) as a reaction medium. The monomers were premixed in a cylinder and then fed to the synthesis unit containing reaction medium and dispersed sodium. The copolymer product obtained 3.5 weight percent 2-methyl-5-vinylpyridine.

The reaction product obtained above was quenched with methanol (100 percent excess based on sodium) to convert sodium and sodium-organo compounds to sodium methylate and then carbon dioxide gas was added to convert sodium methylate to sodium methyl carbonate. The sodium methyl carbonate was removed by filtration from the polymer solution. When desired, the sodium can be converted to sodium sulfide or sodium hydrosulfide by addition of $H_2S$, instead of $CO_2$, and recovered by filtration.

The above recovered polymer solution comprising 15 weight percent polymer was placed in a cylinder and $H_2S$ was added equivalent to 1.5 to 2.0 moles of $H_2S$ per butadiene unit in the polymer. The polymer-$H_2S$ mixture was then passed over a fixed bed of cobalt molybdate catalyst in a ¾ inch diameter x 3 foot long reactor. A small stream of hydrogen gas was also fed to the reactor along with the polymer-$H_2S$ mixture. Conditions for the run were as follows:

Temperature, °F. _____ 500±5
Pressure, p.s.i.g. _____ 800

Feed rate, v./v./hr. _____ 3
Hydrogen, moles/butadiene unit _____ 0.3 to 1.0

In the above run, with hydrogen in the feed the catalyst life was 45 to 50 volumes of polymer per volume of catalyst before the reactor plugged. In previous work with the same catalyst and reaction system and without hydrogen in the feed stream, however, the catalyst case plugged repeatedly after only 2 to 10 volumes of polymer per volume of catalyst has passed through the reactor. The effluent from the reactor was flashed in an oil bath at 250° F. and 1 to 2 mm. Hg absolute pressure.

The polymer obtained in the above run has the following properties:

| | |
|---|---|
| Total sulfur, wt. percent | 3.60 |
| Mercaptan sulfur, wt. percent | 1.39 |
| Viscosity, poises at 77° F. | 428 |
| Ash, wt. percent | 0.053 |
| Volatile, wt. percent (250° F. for 30 min. at 1 mm. Hg) | 6.6 |
| Color, Gardner | 16+ |

The recovered polymer cures well with sulfur in 4 to 12 hours at room temperature. The recipe employed for cure was as follows:

| | Grams |
|---|---|
| Butadiene mercaptan polymer | 10 |
| Sulfur | 1 |
| Zinc oxide | 1 |
| Monoethanolamine | 0.5 |

The cured polymer formed above is useful as a caulking compound and sealing compound.

It will be evident to those skilled in the art that many variations and modifications can be practiced upon consideration of the foregoing disclosure. Such variations and modifications are believed to be within the spirit and scope of the present invention.

We claim:
1. In a process for the production of polymeric mercaptans comprising contacting a liquid copolymer of a conjugated diene of 4 to 10 carbon atoms with $H_2S$ at an elevated temperature and a fixed bed of a cobalt molybdate catalyst active for promoting the reaction of said polymer with $H_2S$ to form said polymeric mercaptan, and recovering said mercaptan product so produced, the improvement which comprises carrying out said contacting in the presence of a small amount of added uncombined hydrogen ranging from 0.1 to 5 mols per diene monomer unit in said polymer sufficient to minimize the formation of insoluble materials during said contacting, thus extending the life of said catalyst.

2. In a process for the production of a polymeric mercaptan comprising contacting under liquid phase conditions a liquid diene polymer of a conjugated diene of 4 to 10 carbon atoms in an inert liquid hydrocarbon reaction medium with $H_2S$ at a temperature in the range 450 to 650° F. with a fixed bed of a cobalt molybdate catalyst to form said polymeric mercaptan, and recovering said polymeric mercaptan thus produced, the improvement comprising carrying out said contacting in the presence of added uncombined hydrogen in an amount ranging from 0.1 to 5 moles of hydrogen per diene monomer unit in said polymer to extend the life of said catalyst by minimizing the formation of insoluble materials during said contacting.

3. A process for the production of a polymeric mercaptan which comprises introducing a reaction mixture of a liquid polymer of 1,3-butadiene in an inert diluent, $H_2S$ and hydrogen into a reaction zone containing a fixed bed of a cobalt molybdate catalyst, contacting said polymer with said $H_2S$ and hydrogen in said zone and said catalyst at a temperature in the range 500 to 550° F. and under autogenous pressure to form said polymeric mercaptan, said contacting being effected in the presence of from 1.5 to 3.0 moles $H_2S$ per butadiene unit in said polymer, and from 0.3 to 1.0 mole of uncombined hydrogen per butadiene unit in said polymer, and recovering said polymeric mercaptan as a product of the process.

4. An improved catalytic process for producing a polymeric mercaptan which comprises the steps of:
 (a) forming a liquid reaction mixture comprising a liquid polymer of a conjugated diene of 4 to 10 carbon atoms, an inert liquid reaction diluent, and $H_2S$, the amount of $H_2S$ ranging from 1.5 to 3 mols per diene monomer unit in said polymer;
 (b) passing said reaction mixture through a reaction zone containing a fixed bed of a cobalt molybdate catalyst at a temperature ranging from 450 to 650° F. and under sufficient pressure to maintain liquid phase conditions to form said polymeric mercaptan; and
 (c) introducing into said reaction zone and said reaction mixture free hydrogen in an amount ranging from 0.1 to 5 mols of hydrogen per diene monomer unit in said polymer to minimize the deposition of insoluble materials during contacting with said catalyst, thus extending the catalyst life.

References Cited by the Examiner

UNITED STATES PATENTS

| | | | |
|---|---|---|---|
| 2,137,584 | 11/1938 | Ott | 260—79 |
| 2,402,586 | 6/1946 | Alvarado | 260—609 |
| 2,466,963 | 4/1949 | Patrick et al. | 260—79.1 |
| 2,495,293 | 1/1950 | Scott | 260—79.1 XR |
| 3,051,695 | 8/1962 | Warner et al. | 260—79 |
| 3,135,716 | 6/1964 | Uraneck et al. | 260—79 |
| 3,138,573 | 6/1964 | Le Fave et al. | 260—79.1 |

LEON J. BERCOVITZ, *Primary Examiner.*

JOSEPH L. SCHOFER, R. A. BURROUGHS, M. I. MARQUIS, *Assistant Examiners.*